Patented Mar. 7, 1950

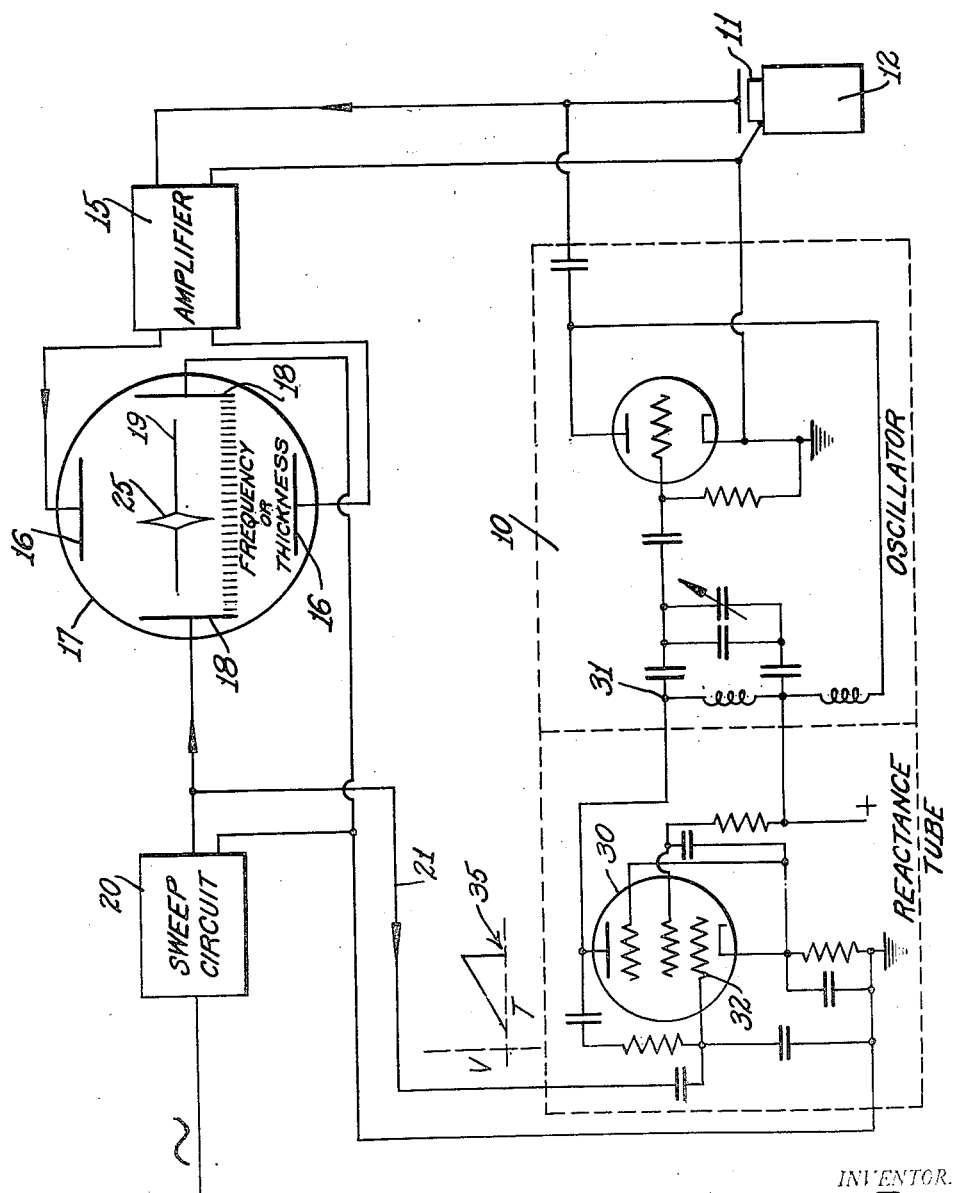

2,499,459

UNITED STATES PATENT OFFICE 2,499,459

RESONANCE DEVICE FOR INSPECTING MATERIALS

Benson Carlin, New York, N. Y., assignor to Sperry Products, Inc., Hoboken, N. J., a corporation of New York Application October 4, 1947, Serial No. 777,931

2 Claims. (Cl. 73—67)

This invention relates to the type of device wherein objects are inspected either for thickness or for defects by impressing on the object supersonic frequencies covering a predetermined range, so that when resonance is established at a given frequency it is a function of the thickness of the object or the depth of a reflecting surface, such as a flaw, beneath the surface of the object. It has heretofore been proposed to apply the supersonic range of frequencies to the object by generating these frequencies in an oscillatory circuit and applying them to a piezo-electric crystal in contact with the entering surface of the object. The crystal will vibrate to a predetermined degree until resonance is established within the object at which time a much larger output will be obtained from the crystal. Such output in the form of a voltage is amplified and applied to an indicator such as an oscilloscope having a horizontal sweep which is deflected vertically by the amplified crystal output. A sharp increase in output as indicated on the sweep will denote resonance, and the position of the sharp increase on the sweep corresponds to a given frequency which in turn corresponds to a depth beneath the surface of the object. In such prior devices the range of frequencies issuing from the oscillator was obtained by varying the reactance of the oscillator circuit by means of a variable capacitor driven from a motor. Thus, periodically the reactance of the circuit was varied through a predetermined range to yield a predetermined range of frequencies which were applied to the crystal.

The above-described prior system called for moving parts in the construction of the variable capacitor and a rotating motor and, unless the moving parts were carefully balanced, stray indications were obtained in the output due to variations introduced by the out of balance of the moving parts. The adjustment of such motor driven capacitor was a difficult, expensive and time consuming task, and the motor required considerable care in use and servicing.

It is the principal object of this invention to provide a resonance type device for performing the above-described function which will avoid the necessity of utilizing any movable parts. For this purpose it is here proposed to vary the reactance of the oscillator circuit through the desired range not by rotatable or otherwise moving elements, but rather by the use of a reactance tube whose reactance can be varied in response to a varying voltage impressed on its input grid. Furthermore, it is proposed to utilize the sweep circuit which generates the sweep for the oscilloscope as the means for providing the voltage variation through the predetermined range which is applied to the input grid of the reactance tube.

Further objects and advantages of this invention will become apparent in the following detailed description thereof.

In the accompanying drawing, the single figure is a wiring diagram illustrating one embodiment of this invention.

Referring to the drawing there is indicated an oscillator 10 whose output is designed to apply a range of frequencies, by means which will be hereinafter described, to a piezo-electric crystal 11 in contact with a workpiece 12 whose thickness is to be measured or which is to be tested for the depth below the entering surface of some other reflecting surface, such as an internal flaw. The electric oscillations are converted into mechanical vibrations by the crystal 11 and the latter are transmitted into the object 12 and after being reflected from the opposite surface are received by the crystal 11 and again transformed into electric voltages which after being amplified by an amplifier 15 may be applied to the vertical plates 16 of an oscilloscope 17 on whose horizontal plates 18 there is designed to be impressed a sweep 19 from a sweep circuit 20. Since the oscillator 10 is synchronized with the output from the sweep circuit through connection 21, the position of an indication such as indication 25 along the sweep will be a function of the time of energization of the oscillator, and since the oscillator is actuated within that time through a predetermined range of frequencies, the position of indication 25 will correspond to a certain frequency which in turn is a function of the depth of the reflecting surface below the entering surface of object 12. The indication 25, being of sharply larger dimension than any other indication along the sweep, indicates the maximum output from object 12 as produced by crystal 11 and denotes resonance.

The method by which the oscillator 10 is caused to generate a predetermined range of frequencies during the period that the sweep 19 is generated will now be described. For this purpose I employ a reactance tube 30 of known type shunted across the oscillator at 31 so that as the reactance of tube 30 varies, the reactance of the oscillator circuit will vary to vary the output frequency.

To cause the oscillator to generate the predetermined range of frequencies, the reactance tube 30 must have applied to its input grid 32 a varying voltage which will produce the necessary variation in reactance of tube 30, which in turn will produce the necessary variation in reactance of the oscillator circuit. Furthermore, this continuously varying voltage which is applied to the input grid 32 must be applied in synchronism with the sweep 19 in order that the position of an indication along the sweep 19 will be a function of the generated frequency. I accomplish both of the foregoing objects by utilizing the voltage output from the sweep circuit and applying said voltage output to the grid 32. This voltage output is indicated in the small graph shown at 35 which shows that the voltage rises steadily to a peak and then drops suddenly. Therefore, as the voltage V is applied to grid 32, the oscillator will start generating an output simultaneously with the sweep 19 and the frequency of such output varies continuously, so that each point along sweep 19 corresponds to a given frequency and the entire sweep 19 covers a complete range of frequencies. Thus, the occurrence of a sharp peak 25 at a predetermined point along the sweep 19 indicates that at the frequency generated at that time interval after the sweep began to be generated, resonance occurred and therefore the reflecting surface is a predetermined distance below the entering surface of object 12 corresponding to said frequency.

If the sweep circuit is periodically energized, as for instance from a suitable A. C. source such as 60 cycle, then 60 times each second the sweep 19 will be generated and simultaneously the range of frequencies will be generated so that an indication such as 25 will be repeated in the same position at the rate of 60 times per second, which is fast enough to permit the eye to retain the visible image.

Having described my invention, what I claim and desire to secure by Letters Patent is:

1. A measuring device of the type in which a range of frequencies is adapted to be impressed upon a piezo-electric crystal in contact with an object to transmit vibrations into the object and receive vibrations therefrom and in which the maximum output is obtained from the crystal when resonance is established in the object, said device including an oscilloscope and vertical and horizontal sets of plates, a sweep circuit for establishing a sweep between one set of plates, the output voltage from the crystal being applied to the other set of plates, characterized by the improvement which includes an oscillatory circuit for generating the frequencies to be impressed on the crystal, means for varying the reactance of the circuit, said last-named means comprising a member whose reactance varies in response to the degree of voltage impressed thereon, and means for impressing on said member the voltage output of the sweep circuit.

2. A measuring device of the type in which a range of frequencies is adapted to be impressed upon a piezo-electric crystal in contact with an object to transmit vibrations into the object and receive vibrations therefrom and in which the maximum output is obtained from the crystal when resonance is established in the object, said device including an oscilloscope and vertical and horizontal sets of plates, a sweep circuit for establishing a sweep between one set of plates, the output voltage from the crystal being applied to the other set of plates, characterized by the improvement which includes an oscillatory circuit for generating the frequencies to be impressed on the crystal, means including a reactance tube connected to the oscillatory circuit to control the reactance of said circuit, said tube having a cathode, an input grid and an anode, the reactance of the tube varying in response to the voltage applied to its input grid, and means for applying to the grid the voltage output of the sweep circuit.

BENSON CARLIN.

REFERENCES CITED

The following references are of record in the file of this patent:

UNITED STATES PATENTS

| Number | Name | Date |
|---|---|---|
| 2,431,234 | Rassweiler et al. | Nov. 18, 1947 |
| 2,433,804 | Wolff | Dec. 30, 1947 |